UNITED STATES PATENT OFFICE 2,417,635

REFINING OF CRUDE ACRYLONITRILE

Harold S. Davis, Greenwich, Conn., assignor to American Cyanamid Company, New York, N. Y., a corporation of Maine No Drawing. Application August 23, 1943, Serial No. 499,691

6 Claims. (Cl. 260—464)

The present invention relates to the refining of crude acrylonitrile, and more specifically to a method of removing acetylene polymers therefrom.

Crude acrylonitrile as now produced, may contain impurities of the acetylene polymer type, such as, for example, divinyl acetylene and its isomer, ethinyl butadiene, which have boiling points close to that of pure acrylonitrile. Consequently, removal of these impurities by fractional distillation is extremely difficult.

It is highly important that these impurities be removed, as they promote instability and cause polymerization of the acrylonitrile. Their presence in the nitrile can be readily detected by an increase in the refractive index and a lowering of the density.

Divinyl acetylene has a boiling point of 83.5° C. at 760 mm., a refractive index of 1.5047 and a density of 0.7759 at 20° C. The physical constants of ethinyl butadiene are substantially the same as those of divinyl acetylene. Acrylonitrile has a boiling point of 77.5° C. at 760 mm., a refractive index of 1.3915 and a density of 0.8062 at 20° C.

I have discovered a simple and convenient method of removing impurities of the above type from crude acrylonitrile which takes advantage of the selective solution of the acrylonitrile in water. The acetylene polymer impurities are substantially water-insoluble, whereas acrylonitrile is soluble in water at ordinary room temperatures to the extent of about 7 to 7.5%, and with increasing quantities at higher temperatures, for example, 7.2% at 20° C., 8% at 40° C., 9.2% at 60° C., 10.3% at 75° C. and 13.5% at 95° C. under moderate pressure.

Crude acrylonitrile containing impurities of the acetylene polymer type may also contain acetaldehyde, a low boiling impurity. Aldehydes, and especially acetaldehyde, promote the solubility of the acetylene polymers in water. Therefore, in carrying out the present process it is highly important that the crude acrylonitrile be substantially free from impurities tending to promote water solubility of the acetylene polymers. The acetaldehyde may be readily removed from the crude acrylontrile by ordinary fractional distillation.

The novel method consists in mixing the crude acrylonitrile, substantially free from compounds tending to promote water solubility of the acetylene polymers with sufficient water to dissolve the acrylonitrile. The mixture upon standing separates into two layers, leaving the acetylene polymer impurities as the upper layer which may be removed, for example, by decantation. The lower or water layer is fractionated to recover the acrylonitrile therefrom and the water returned to the cycle.

The acetylene polymers, and particularly the divinyl acetylene, are known to absorb oxygen readily and form highly explosive compounds. Therefore, in carrying out the present method, the high concentrations of divinyl acetylene which collect in the upper layer may present an explosion hazard. I have found that this danger can be overcome by adding a suitable quantity of a water-insoluble liquid to the crude acrylonitrile-water mixture, said liquid not only functioning as a diluent for the acetylene polymer impurities, but also as a solvent therefor, thus increasing the efficency of the process. Substances suitable for this purpose include aromatic hydrocarbons having boiling points within the range of 110° to 160° C., such as, for example, toluene, xylene, ethyl benzene, propyl benzene and the like. Other water-insoluble liquid hydrocarbons may also be used, such as certain petroleum fractions which are solvents for the acetylene polymers, and in which the acrylonitrile is substantially insoluble.

The amount of acetylene polymers found in crude acrylonitrile rarely exceeds 10%, and usually is of the order of 2% or less. A countercurrent washing column is preferred, particularly when extracting a crude acrylonitrile containing a considerable quantity of the impurities.

The invention will be illustrated in greater detail by the following examples:

Example I

In a vessel equipped with a stirrer and a reflux condenser, 200 ml. of crude acrylonitrile (from which substantially all acetaldehyde had been removed, but containing as impurities 1.1% of divinyl acetylene and having a refractive index of 1.3905 at 25° C.) were agitated for 20 minutes with 1500 ml. of water at 60° C. The mixture after standing a few minutes, separated into two layers. The lower layer of acrylonitrile dissolved in water was siphoned off and introduced into a still, fitted with a fractionating column. The acrylonitrile was removed from the aqueous mixture as an acrylonitrile-water azeotrope, distilling at about 70° C. Upon standing, the azeotrope separated into two layers. The upper layer of wet acrylonitrile was withdrawn and fractionally distilled. The dry distillate had a boiling point of 77.5° C. at 760 mm. and a refractive index of 1.3892 at 25° C.

Example II

A mixture consisting of 393 ml. of crude acrylonitrile (from which substantially all acetaldehyde had been removed, but containing as impurities 4.2 of acetylene polymers and having a refractive index of 1.3940 at 25° C.), 4500 ml. of water and 50 ml. of xylene was stirred and heated at approximately 65° C. in a vessel of the type used in Example I. After stirring for fifteen minutes, the mixture was allowed to stand until two layers formed. The lower layer of water containing acrylonitrile was removed and the acrylonitrile recovered therefrom according to the procedure of Example I. The thus purified acrylonitrile had a refractive index of 1.3892 at 25° C.

The upper layer of xylene from the above run containing not only the acetylene polymers but some dissolved acrylonitrile was then treated with 4500 ml. of water for the purpose of recovering the acrylonitrile. The mixture, upon standing, separated into two layers and the upper xylene layer containing the acetylene polymers was discarded. The lower water layer containing the recovered acrylonitrile was then utilized in refining the crude acrylonitrile in a subsequent run.

The method herein described is of particular utility in that it provides a marketable product of high purity.

While the invention has been described with particular reference to specific embodiments, it is to be understood that it is not to be limited thereto but is to be construed broadly and restricted solely by the scope of the appended claims.

I claim:
1. The method of removing acetylene polymer impurities from a crude acrylonitrile containing an acetylene polymer, and impurities tending to promote water solubility of an acetylene polymer which comprises removing through fractional distillation the water solubility promoting impurities and then treating the thus purified acrylonitrile with water, separating and recovering the acrylonitrile therefrom.

2. The method of claim 1 further characterized in that the water is heated so as to provide greater solubility of the acrylonitrile therein.

3. The method of claim 1 further characterized in that a water-insoluble solvent for the acetylene polymer impurities is added while treating the crude acrylonitrile with water.

4. The method of removing acetylene polymer impurities from crude acrylonitrile containing the same and impurities tending to promote water solubility of the same which comprises removing through fractional distillation the water solubility promoting impurities and then treating the thus purified acrylonitrile with a quantity of water sufficient to dissolve the acrylonitrile, allowing the mixture to separate into two layers, removing the acrylonitrile-water layer and recovering the acrylonitrile therefrom.

5. The method of removing divinyl acetylene from crude acrylonitrile containing acetaldehyde which comprises treating the crude acrylonitrile to remove acetaldehyde, treating the thus purified acrylonitrile with water, allowing the resulting mixture to separate into two layers, removing the lower layer and recovering the acrylonitrile from said layer.

6. The method of claim 5 further characterized in that xylene is added while treating the crude acrylonitrile with water.

HAROLD S. DAVIS.

REFERENCES CITED

The following references are of record in the file of this patent:

UNITED STATES PATENTS

| Number | Name | Date |
| --- | --- | --- |
| 2,324,854 | Kurtz et al. | July 20, 1943 |
| 2,210,320 | Kautter et al. | Aug. 6, 1940 |
| 2,174,756 | Pieroh | Oct. 3, 1939 |
| 2,245,945 | Van Dijck et al. | June 17, 1941 |

OTHER REFERENCES

Chem. Rubber Co., "Handbook of Chem. and Physics," (26th ed.), pp. 568–9. (Div. 6.)